(12) United States Patent
Burlatsky et al.

(10) Patent No.: US 8,309,264 B2
(45) Date of Patent: Nov. 13, 2012

(54) FUEL CELL FLOW FIELD HAVING STRONG, CHEMICALLY STABLE METAL BIPOLAR PLATES

(75) Inventors: Sergei F. Burlatsky, West Hartford, CT (US); Jean Colpin, Avon, CT (US); Shubhro Ghosh, Manchester, CT (US); Nikunj Gupta, Windsor, CT (US); Patrick L. Hagans, Columbia, CT (US); Weilong Zhang, Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 548 days.

(21) Appl. No.: 12/514,507

(22) PCT Filed: Dec. 8, 2006

(86) PCT No.: PCT/US2006/046833
§ 371 (c)(1),
(2), (4) Date: May 12, 2009

(87) PCT Pub. No.: WO2008/069801
PCT Pub. Date: Jun. 12, 2008

(65) Prior Publication Data
US 2010/0040911 A1    Feb. 18, 2010

(51) Int. Cl.
*H01M 2/38* (2006.01)
(52) U.S. Cl. .......................... 429/457; 429/518; 429/522
(58) Field of Classification Search .............. 429/514, 429/518–522, 468, 457, 513
See application file for complete search history.

(56) References Cited

U.S. PATENT DOCUMENTS

| 5,733,682 | A | 3/1998 | Quadakkers et al. |
| 6,426,161 | B1 | 7/2002 | Cisar et al. |
| 6,777,126 | B1 | 8/2004 | Allen |
| 6,942,941 | B2 | 9/2005 | Blunk et al. |
| 6,989,213 | B2 | 1/2006 | Kaiser et al. |
| 2001/0026884 | A1 | 10/2001 | Appleby et al. |
| 2002/0048699 | A1* | 4/2002 | Steele et al. ............ 429/30 |
| 2002/0048700 | A1 | 4/2002 | Virkar et al. |
| 2002/0094465 | A1 | 7/2002 | Fleck et al. |
| 2002/0155338 | A1 | 10/2002 | Croset |

(Continued)

FOREIGN PATENT DOCUMENTS

| WO | WO0076015 | 12/2000 |
| WO | WO2004038842 | 5/2004 |

OTHER PUBLICATIONS

Search Report and Written Opinion mailed on Sep. 14, 2007 for PCT/US2006/046833.

(Continued)

*Primary Examiner* — Thanhha Pham
(74) *Attorney, Agent, or Firm* — Carlson, Gaskey & Olds PC

(57) ABSTRACT

A bipolar plate (30) for use in a fuel cell stack (10) includes one or more first metal layers (40*a*) having a tendency to grow an electrically passive layer in the presence of a fuel cell reactant gas and one or more second metal layers (40*b*) directly adjacent the one or more first metal layers (40*a*). The second metal layer has a tendency to resist growing any oxide layer in the presence of the fuel cell reactant gas to maintain a threshold electrical conductivity. The second metal layer also has a section for contacting an electrode (12, 14) and providing an electrically conductive path between the electrode (12, 14) and the first metal layer.

16 Claims, 1 Drawing Sheet

U.S. PATENT DOCUMENTS

2002/0172849 A1 11/2002 Fan et al.
2004/0101738 A1 5/2004 Tawfik et al.
2004/0137309 A1 7/2004 Allen et al.
2007/0231676 A1* 10/2007 Cassidy et al. .................. 429/44

OTHER PUBLICATIONS

Notification of Transmittal of the International Preliminary Report on Patentability mailed on Mar. 20, 2009 for PCT/US2006/046833.

* cited by examiner

FUEL CELL FLOW FIELD HAVING STRONG, CHEMICALLY STABLE METAL BIPOLAR PLATES

1. FIELD OF THE DISCLOSURE

This disclosure generally relates to fuel cells and, more particularly, to flow field plates for fuel cells.

2. DESCRIPTION OF THE RELATED ART

Fuel cells are widely known and used for generating electricity in a variety of applications. Typically, a fuel cell unit includes an anode, a cathode, and an ion-conducting polymer exchange membrane (PEM) between the anode and the cathode for generating electricity in a known electrochemical reaction. Several fuel cell units are typically stacked together to provide a desired amount of electrical output. Typically, a bipolar plate is used to separate adjacent fuel cell units. In many fuel cell stack designs, the bipolar plate also functions to conduct electrons within an internal circuit as part of the electrochemical reaction to generate the electricity.

Presently, the bipolar plates are made of graphite to provide electrical conductivity. The graphite is also resistant to corrosion within the relatively harsh environment of the fuel cell. However, a significant drawback of using graphite is that the plate must be relatively thick to achieve a desired strength, thereby reducing power density of the fuel cell stack. Alternatively, there have been proposals to fabricate the bipolar plates out of a metal. However, the metal corrodes in the fuel cell environment, thereby producing an electrically insulating layer that undesirably increases an electrical contact resistance between the bipolar plate and the cathode and anode electrodes. A relatively thin bipolar plate that resists corrosion is needed to increase the power density and reduce the cost of a fuel cell stack.

SUMMARY OF THE DISCLOSURE

One example bipolar plate for use in a fuel cell stack includes at least one first metal layer that will grow an electrically passive layer at a first rate in the presence of a fuel cell reactant gas and at least one second metal layer directly adjacent the first metal layer. When in direct contact with the first metal layer, the second metal layer has the ability to resist growing a second metal oxide layer in the presence of the fuel cell reactant gas so that the second metal layer maintains a threshold electrical conductivity suitable for use in a fuel cell. The second metal layer also provides an electrically conductive path between the electrode and the first metal layer.

In one example, a fuel cell assembly includes a cell stack having a plurality of electrodes and a plurality of bipolar plates as described above.

An example method of using a bipolar plate as, described above includes resisting growth of any oxide layer on the second metal layer to maintain a threshold electrical conductivity such that the second metal layer provides an electrically conductive path between the electrode and the first metal layer.

The various features and advantages of this disclosure will become apparent to those skilled in the art from the following detailed description. The drawings that accompany the detailed description can be briefly described as follows.

DETAILED DESCRIPTION OF THE PREFERRED EMBODIMENTS

Figure 1:
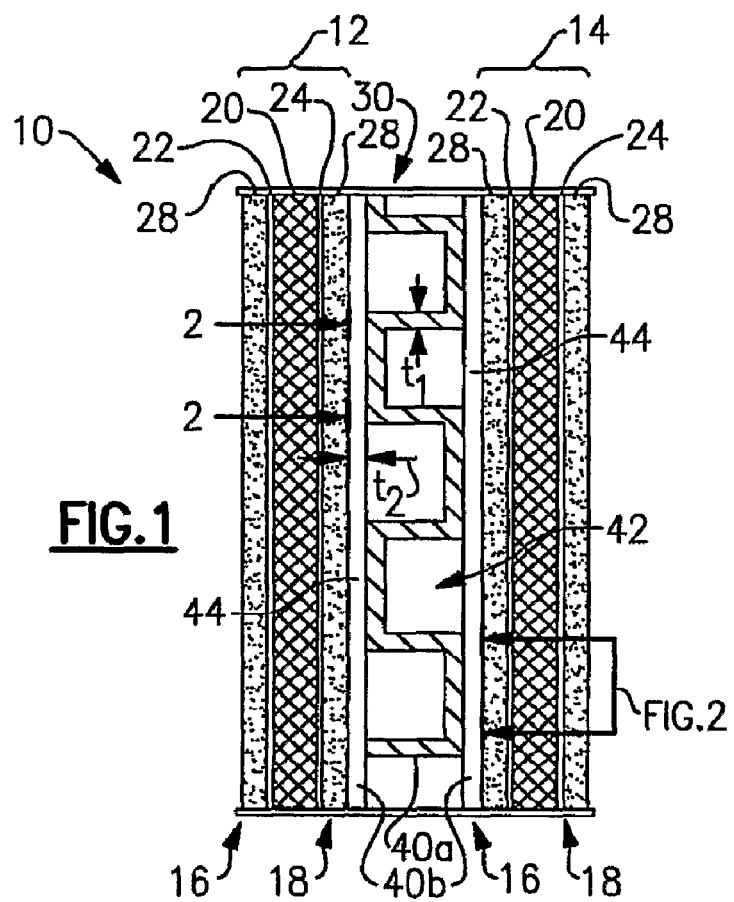
FIG. 1 illustrates selected portions of an example fuel cell stack.

FIG. 1 schematically illustrates selected portions of an example fuel cell stack 10 for generating electricity. In this example, the fuel cell stack 10 includes fuel cells 12 and 14 that each has a cathode 16 that receives a first reactant gas and an anode 18 that receives a second reactant gas to generate an electric current using a known reaction. Each fuel cell 12 and 14 includes a polymer exchange membrane (PEM) 20 that separates a cathode catalyst 22 from an anode catalyst 24, and gas diffusion layers 28 that distribute the reactant gases over the respective cathode catalyst 22 and anode catalyst 24 in a known manner. In one example, the gas diffusion layers 28 include a porous material such as a porous carbon cloth. A metal bipolar plate 30 separates the fuel cells 12 and 14.

The metal bipolar plate 30 includes a first metal layer 40a coupled with at least one second metal layer 40b. In this example, a second metal layer 40b is provided between the first metal layer 40a and each of the fuel cells 12 and 14, respectively.

In one example, the second metal layers 40b comprise a mesh. In some examples, the second metal layers 40b are bonded to the first metal layer 40a using any of a variety of known methods, such as diffusion bonding, brazing, welding, or another method. The first metal layer 40a provides the bipolar plate with mechanical strength, and the second metal layers 40b provide the bipolar plate with corrosion resistance to maintain a desired level of electric conductivity between the fuel cells 12 and 14 and the first metal layer 40a.

In this example, the first metal layer 40a is solid and continuous and is formed in a known manner to include reactant gas channels 42. The second metal layers 40b are generally planar mesh sheets that extend over the reactant gas channels 42. The second metal layers 40b include sections 44 that are in direct contact with the first metal layer 40a and the gas diffusion layers 28 of the fuel cells 12 and 14 such that the sections 44 provide an electrically conductive path between the fuel cells 12 and 14 and the first metal layer 40a.

Figure 2:
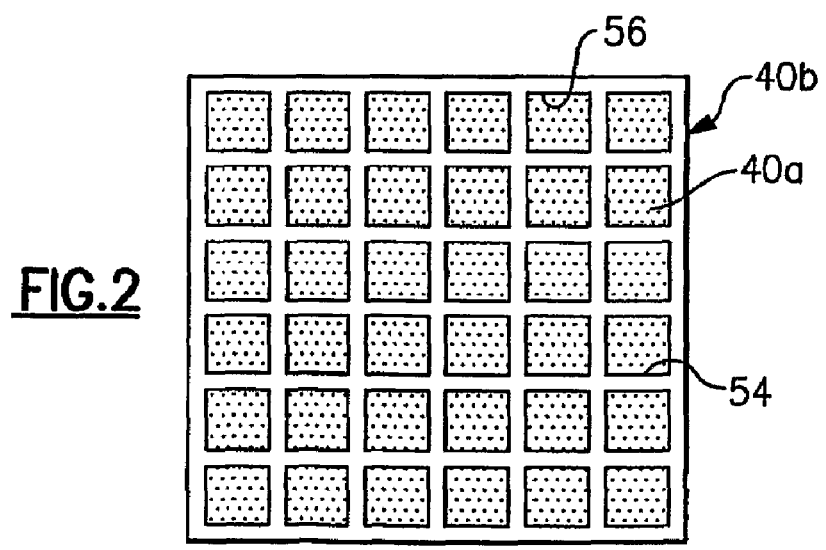
FIG. 2 illustrates metal layers of a bipolar plate of the example fuel stack cell.

FIG. 2 illustrates an example mesh pattern of a second metal layer 40b. In this example, each second metal layer 40b includes wires 54 arranged with openings 56 in between the wires 54. Given this description, one of ordinary skill in the art will recognize alternative types of mesh patterns suitable to meet their particular needs.

In operation, the electrochemical reactions of the reactant gases within the fuel cells 12 and 14 produce a relatively harsh environment for the metal bipolar plate 30. For example, the cathode 16 produces an acidic oxidizing environment and the anode 18 produces an acidic, reducing environment. In the disclosed example, the first metal layer 40a has a tendency to grow an oxide layer, such as an oxide scale, in the presence of the reactant gas. In some examples, the first metal layer 40a grows oxide scales on surface portions that are not directly coupled to the second metal layers 40b. The second metal layers 40b also have a tendency to grow any oxide layer, but at a slower growth rate relative to the oxide layer on the first metal layer 40a. Oxide layers are generally poor electrical conductors and tend to reduce the conductivity of the bipolar plate 30. Having the second metal layer(s) 40b with a relatively slower growth rate facilitates maintaining a selected electrical conductivity through the sections 44 of the second metal layers 40b between the fuel cell electrodes 12, 14 and the first metal layer 40a even though the growth rate of the oxide layer on the first metal layer 40a might otherwise be too thick to conduct on its own. In some examples, the second metal layers 40b may grow an electrically insignificant amount of oxide layer. In other examples, there may be no oxide layer at all.

In one example, the threshold for electrical conductivity is pre-selected during a design stage of the fuel cell stack 10 to achieve a desired level of performance over a selected useful life of the fuel cell stack 10.

In one example, the first metal layer 40a is made of a first type of metal (or metallic alloy) and the second metal layers 40b are made of a second, different type of metal (or metallic alloy). In one example, the first type of metal is steel and the second type of metal is a nickel or nickel alloy, titanium or titanium alloy, stainless steel, platinum or platinum alloy, or a combination of them. The listed metals and metal alloys for the second type of metal provide a desirable corrosion resistance for maintaining a selected electrical conductivity over the electrically conductive path.

In one example, the second metal layers 40b are nickel alloy. In one example the nickel alloy includes a nominal composition of about 22 wt % chromium, about 14 wt % tungsten, about 2 wt % molybdenum, about 0.5 wt % manganese, about 0.4 wt % silicon, about 0.3 wt % aluminum, about 0.10 wt % carbon, about 0.02 wt % lanthanum, up to about 5 wt % cobalt, up to about 3 wt % iron, up to about 0.015 wt % boron, and the remaining wt % nickel. This example nominal composition provides the benefit of a desirable corrosion resistance for maintaining a selected electrical conductivity over the electrically conductive path. The term "about" as used in this description relative to the compositions refers to possible variation in the compositional percentages, such as normally accepted variations or tolerances in the art.

In this example, the first metal layer 40a has a uniform thickness $t_1$ and the second metal layers 40b have a uniform thickness $t_2$ that is less than the thickness $t_1$. The thickness $t_1$ is suitable for providing a desired amount of mechanical strength to support the bipolar plate between the fuel cells 12 and 14. The thickness $t_2$ is suitable for maintaining a desired contact between the first metal layer 40a such that the first metal layer 40a does not significantly corrode.

The disclosed example metal bipolar plate 30 provides the benefit of improved power density compared to previously known graphite bipolar plates. The example metal bipolar plate 30 includes the first metal layer 40a to provide mechanical strength and the second metal layer 40b to provide corrosion resistance. The corrosion resistance maintains a desired level of electric conductivity to thereby allow the use of metallic materials in the relatively harsh environment of a fuel cell stack without significant penalty to conductivity. Moreover, the high strength of metallic materials compared to graphite allows the example bipolar plate 30 to be relatively thinner compared to graphite plates. Thinner bipolar plates reduce the cell stack assembly size and provide more power per volume of a fuel cell stack.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

We claim:

1. A device for use in a fuel cell stack, comprising:

a bipolar plate having at least one first metal layer that is solid and continuous, the at least one first metal layer including a cathode side and an anode side that each include reactant gas channels, and having a first oxide layer with a first growth rate in the presence of a fuel cell reactant gas; and a plurality of second metal layers, with one of the plurality of second metal layers being directly adjacent to the anode side and another of the plurality of second metal layers being directly adjacent the cathode side, each of the plurality of second metal layers comprising a mesh having a second oxide layer with a second growth rate less than the first growth rate in the presence of the fuel cell reactant gas such that the second oxide layer maintains a selected electrical conductivity, each of the plurality of second metal layers being directly bonded to the at least one first metal layer for providing an electrically conductive path between an electrode and the at least one first metal layer.

2. The bipolar plate as recited in claim 1, wherein the mesh comprises a planar sheet in direct contact with the at least one first metal layer and extending over the reactant gas channels.

3. The bipolar plate as recited in claim 1, wherein each of the plurality of second metal layers comprises a nickel or nickel alloy, titanium or titanium alloy, stainless steel, platinum or platinum alloy, or combination thereof.

4. The bipolar plate as recited in claim 1, wherein each of the plurality of second metal layers comprises a nickel alloy.

5. The bipolar plate as recited in claim 4, wherein the nickel alloy includes a nominal composition of about 22 wt % chromium, about 14 wt % tungsten, about 2 wt % molybdenum, about 0.5 wt % manganese, about 0.4 wt % silicon, about 0.3 wt % aluminum, about 0.10 wt % carbon, about 0.02 wt % lanthanum, up to about 5 wt % cobalt, up to about 3 wt % iron, up to about 0.015 wt % boron, and a remainder wt % nickel.

6. The bipolar plate as recited in claim 1, wherein the at least one first metal layer comprises steel.

7. The bipolar plate as recited in claim 1, wherein:

the at least one first metal layer comprises steel; and each of the plurality of second metal layers includes a nominal composition of about 22 wt % chromium, about 14 wt % tungsten, about 2 wt % molybdenum, about 0.5 wt % manganese, about 0.4 wt % silicon, about 0.3 wt % aluminum, about 0.10 wt % carbon, about 0.02 wt % lanthanum, up to about 5 wt % cobalt, up to about 3 wt % iron, up to about 0.015 wt % boron, and a remainder wt % nickel.

8. The bipolar plate as recited in claim 1, wherein the at least one first metal layer comprises a first corrosion resistance corresponding to the first growth rate and the at least one second metal layer comprises a second corrosion resistance corresponding to the second growth rate.

9. A fuel cell assembly comprising:
a plurality of electrodes; and
a bipolar plate associated with the electrodes, the bipolar plate comprising:
at least one first metal layer that is solid and continuous, the at least one first metal layer including a cathode side and an anode side that each include reactant gas channels, and having ability to grow an oxide layer with a first growth rate in the presence of a fuel cell reactant gas; and
a plurality of second metal layers, with one of the plurality of second metal layers being directly adjacent to the anode side and another of the plurality of second metal layers being directly adjacent the cathode side, the plurality of second metal layers each comprising a mesh having ability to grow a second oxide layer with a second growth rate in the presence of the fuel cell reactant gas such that the second oxide layer maintains a selected electrical conductivity, each of the plurality of second metal layers being directly bonded to the at least one first metal layer for providing an electrically conductive path between one of the plurality of electrodes and the at least one first metal layer.

10. The assembly as recited in claim 9, wherein the mesh of each of the plurality of second metal layers includes wires defining openings there between.

11. The assembly as recited in claim 9, further including a polymer exchange membrane arranged between two of the plurality of electrodes.

12. The assembly as recited in claim 9, wherein the at least one first metal layer has a uniform thickness.

13. The assembly as recited in claim 9, wherein each of the plurality of second metal layers is bonded to the at least one first metal layer.

14. The assembly as recited in claim 9, wherein each of the plurality of second metal layers comprises a nickel alloy and the at least one first metal layer comprises steel.

15. The assembly as recited in claim 9, wherein each of the plurality of second metal layers is in direct contact with the one of the electrodes on one side and in direct contact with the at least one first metal layer on an opposite side.

16. A method of using a bipolar plate, the method comprising:
providing a bipolar plate having at least one first metal layer that is solid and continuous, the at least one first metal layer including a cathode side and an anode side that each include reactant gas channels, and having a first oxide layer with a first growth rate in the presence of a fuel cell reactant gas and a plurality of second metal layers, with one of the plurality of second metal layers being directly adjacent to the anode side and another of the plurality of second metal layers being directly adjacent the cathode side, each of the plurality of second metal layers comprising a mesh having a second oxide layer with a second growth rate less than the first growth rate in the presence of the fuel cell reactant gas, each of the plurality of second metal layers being directly bonded to the at least one first metal layer for providing an electrically conductive path between an electrode and the at least one first metal layer; and
establishing a resistance to growth of the second oxide layer of the plurality of second metal layers by selecting the at least one first metal layer to include steel and selecting the plurality of second metal layers to include a nickel alloy in order to maintain a selected electrical conductivity in the plurality of second metal layers such that the plurality of second metal layers provide an electrically conductive path between a fuel cell electrode and the at least one first metal layer.

* * * * *